United States Patent
Farr et al.

(10) Patent No.: US 7,348,075 B2
(45) Date of Patent: Mar. 25, 2008

(54) SYSTEM AND METHOD FOR FABRICATING THREE-DIMENSIONAL OBJECTS USING SOLID FREE-FORM FABRICATION

(75) Inventors: Isaac Farr, Corvallis, OR (US); Christopher Oriakhi, Corvallis, OR (US); Terry M Lambright, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 10/696,335

(22) Filed: Oct. 28, 2003

(65) Prior Publication Data

US 2005/0087903 A1  Apr. 28, 2005

(51) Int. Cl.
    *B32B 9/00* (2006.01)
(52) U.S. Cl. ............... 428/701; 428/702; 501/151
(58) Field of Classification Search ............ 428/701, 428/702
    See application file for complete search history.

(56) References Cited

U.S. PATENT DOCUMENTS

| 4,794,171 | A | 12/1988 | Tagaya et al. |
| 5,952,093 | A * | 9/1999 | Nichols et al. ............ 428/323 |
| 6,540,784 | B2 | 4/2003 | Barlow et al. |
| 2002/0009622 | A1* | 1/2002 | Goodson ................... 428/703 |
| 2005/0197431 | A1* | 9/2005 | Bredt et al. .................. 524/81 |

FOREIGN PATENT DOCUMENTS

| DE | 10158233 A1 | 11/2001 |
| WO | WO 00/26026 | 5/2000 |

* cited by examiner

*Primary Examiner*—Jennifer C. McNeil
*Assistant Examiner*—Gordon R. Baldwin

(57) ABSTRACT

A method for solid free-form fabrication of a three-dimensional object includes depositing a particulate blend in a defined region, the particulate blend including a calcium phosphate source, a reaction retardant, and a layered double hydroxide, and selectively ink-jetting a solubilizing binder onto a predetermined volume of the particulate blend to form a pre-ceramic object in the predetermined volume, wherein the solubilizing binder includes wetting agents, humectants, pH modifiers, and surfactants.

12 Claims, 6 Drawing Sheets

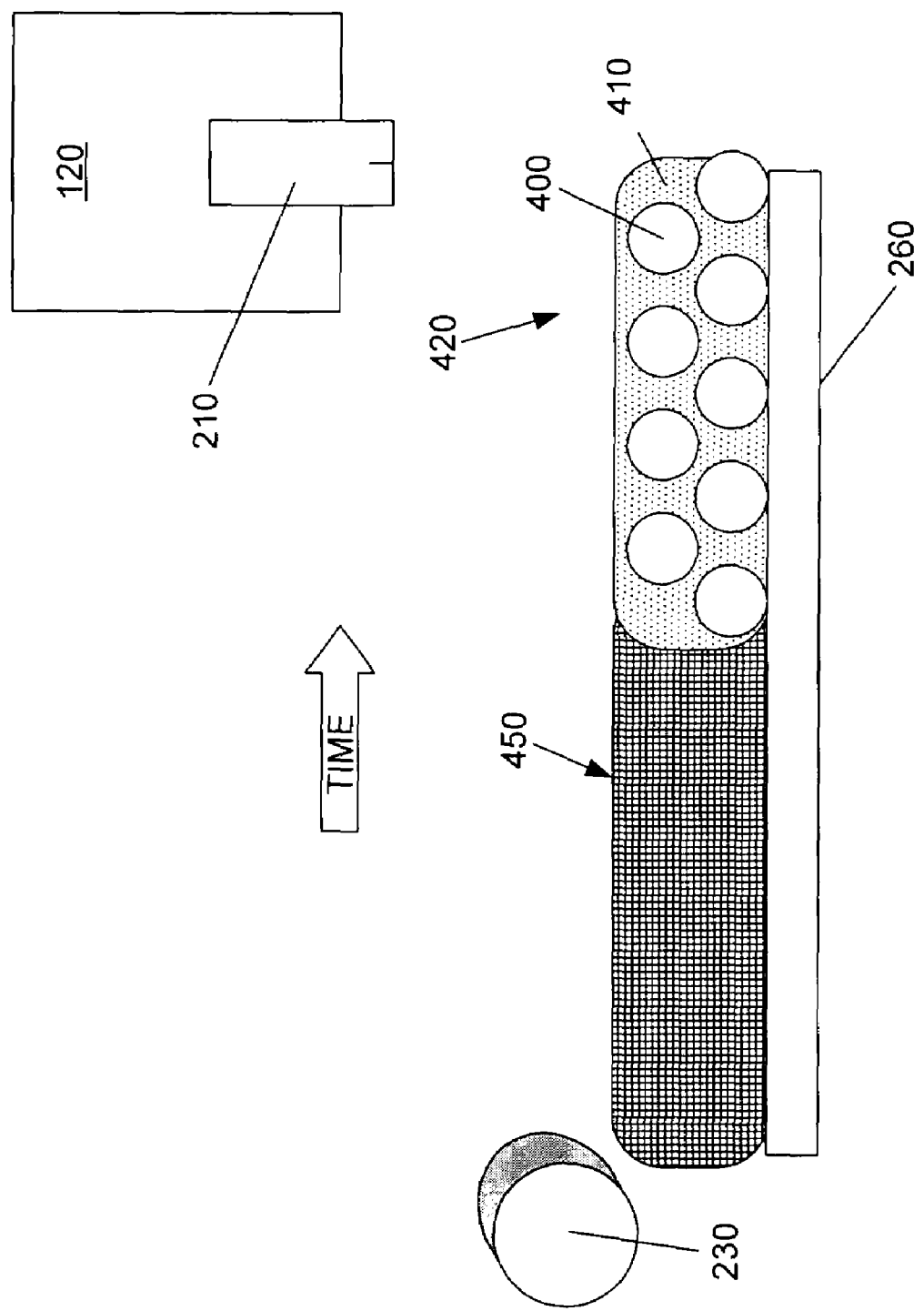

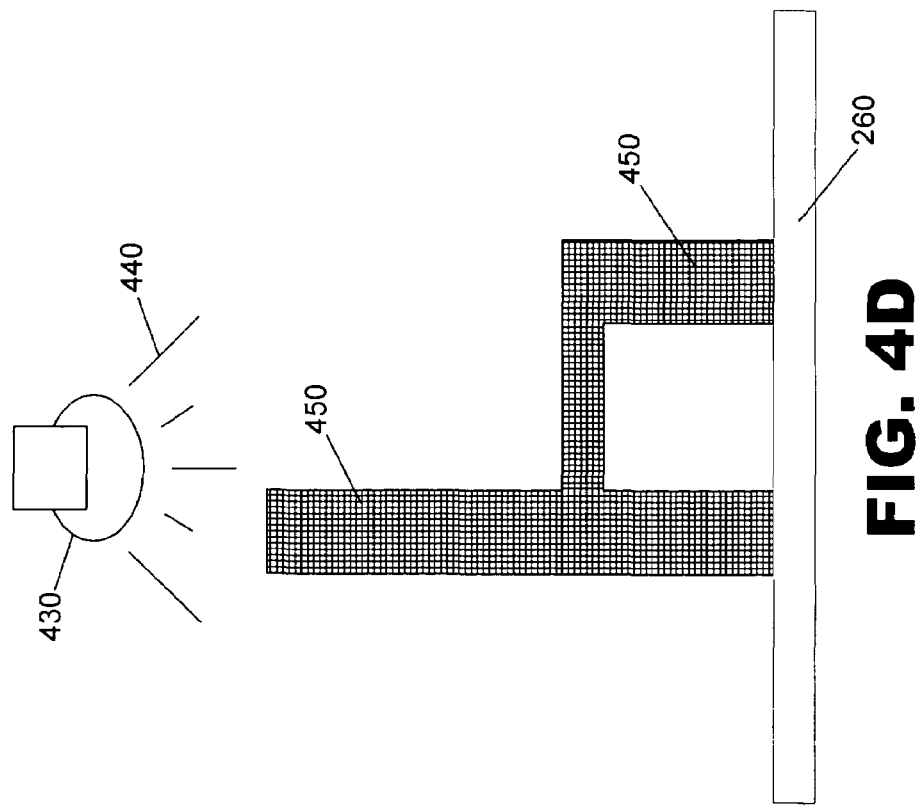
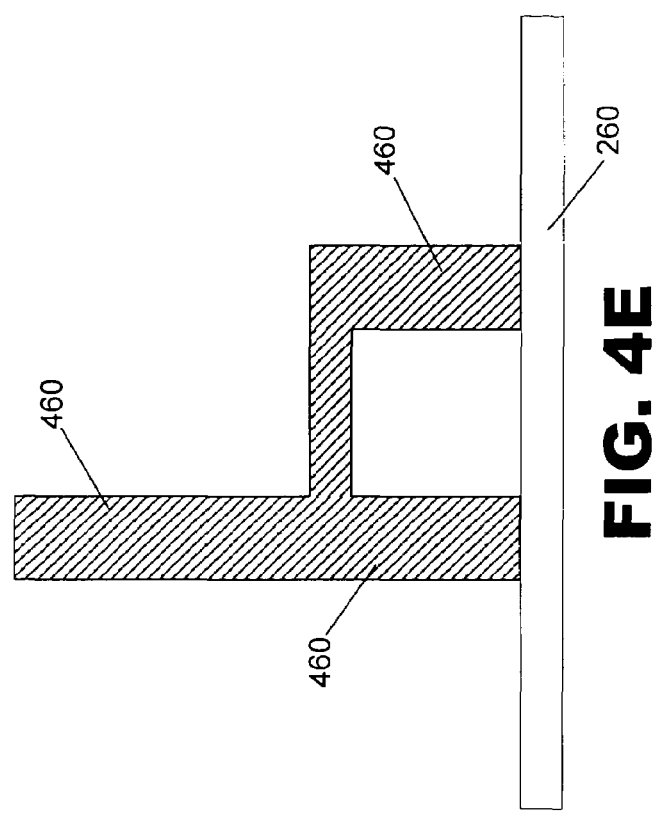

SYSTEM AND METHOD FOR FABRICATING THREE-DIMENSIONAL OBJECTS USING SOLID FREE-FORM FABRICATION

BACKGROUND

The efficient production of prototype three-dimensional compositions or objects can provide an effective means of reducing the time it takes to bring a product to market at a reasonable cost. A typical approach for preparing prototypes has required specific tooling such as molds and dies, which can be a slow and cumbersome process.

Recently, computerized modeling has alleviated some of the need for building prototypes by providing a good idea of what a product will look like without a specialized tooling requirement. However, the fabrication of a tangible object is still often preferred for prototyping. The merging of computer modeling and the physical formation of three-dimensional objects is sometimes referred to as solid free-form fabrication.

Solid free-form fabrication (SFF) is a process whereby three-dimensional objects such as prototype parts, models, working tools, production parts, molds, and other articles are manufactured by sequentially depositing layers of a structural material. Computer aided design (CAD) is commonly used to automate the design process. Using a suitable computer, an operator may design a three-dimensional article and then create that object by employing a positionable ejection head that selectively emits the structural material. Various techniques that employ SFF have been explored.

Traditional methods of forming SFF objects include using commercially available gypsum and biopolymer systems or acid-base cements. Traditional methods have also been developed to form ceramic objects. These traditional methods create ceramic objects with relatively low green strength and low dimensional accuracy. Additionally, traditional methods for creating ceramic objects through SFF are slow to solidify and are very sensitive to environmental conditions.

SUMMARY

A method for solid free-form fabrication of a three-dimensional object includes depositing a particulate blend in a defined region, the particulate blend including a calcium phosphate source, a reaction retardant, and a layered double hydroxide, and selectively ink-jetting a solubilizing binder onto a predetermined volume of the particulate blend to form a pre-ceramic object in the predetermined volume, wherein the solubilizing binder includes wetting agents, humectants, pH modifiers, and surfactants.

BRIEF DESCRIPTION OF THE DRAWINGS

The accompanying drawings illustrate various exemplary embodiments of the present system and method and are a part of the specification. The illustrated embodiments are merely examples of the present system and method and do not limit the scope thereof.

FIG. 4C is a cross-sectional view illustrating an exemplary dissolution/reprecipitation of calcium phosphate according to one exemplary embodiment.

FIG. 4D is a cross-sectional view illustrating the firing of a pre-ceramic object according to one exemplary embodiment.

FIG. 4E is a cross-sectional view illustrating a ceramic object formed by the present method according to one exemplary embodiment.

Throughout the drawings, identical reference numbers designate similar, but not necessarily identical, elements.

DETAILED DESCRIPTION

An exemplary method and apparatus for forming ceramic SFF articles is described herein. More specifically, a powder-based process incorporating inkjet technology is used to fabricate pre-ceramic three-dimensional objects which, after firing at elevated temperatures, yield extremely strong ceramic objects with good retention of pre-ceramic detail. Accordingly, an exemplary additive fabrication process is presented that includes the distribution of calcium phosphate-based powders followed by the jetting of an appropriate solubilizing binder to define a desired three-dimensional object. The solubilizing binder enables a dissolution/reprecipitation of calcium phosphate in the desired three-dimensional object. Once the desired dissolution/reprecipitation of calcium phosphate has occurred, a three-dimensional pre-ceramic object results that may then be removed from un-bound powder and fired to form the desired three-dimensional ceramic object. The present specification discloses the composition of both exemplary solubilizing binders and various exemplary calcium phosphate-based powders that can be used to fabricate three-dimensional ceramic objects.

As used in this specification and in the appended claims, the term "binder" is meant to be understood broadly as any material used to physically bind separate particles together or facilitate adhesion to a surface. Additionally, the term "substrate" is meant to be understood as any build platform, removable material, or previously deposited reactive or powder material. A "build platform" is typically the rigid substrate that is used to support deposited material from an SFF apparatus. Moreover, the term "firing" is meant to be understood as any process configured to provide thermal energy to a pre-ceramic object in order to vitrify, sinter, or otherwise change the physical attributes of the pre-ceramic object thereby forming a ceramic object. The term "dissolution" is meant to be understood as any process whereby a solid separates into component parts or goes into solution. In contrast, the term "reprecipitation" is meant to be understood as any process of forming a chemical precipitate from a solution.

In the following description, for purposes of explanation, numerous specific details are set forth in order to provide a thorough understanding of the present system and method for forming three-dimensional ceramic objects using SFF. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
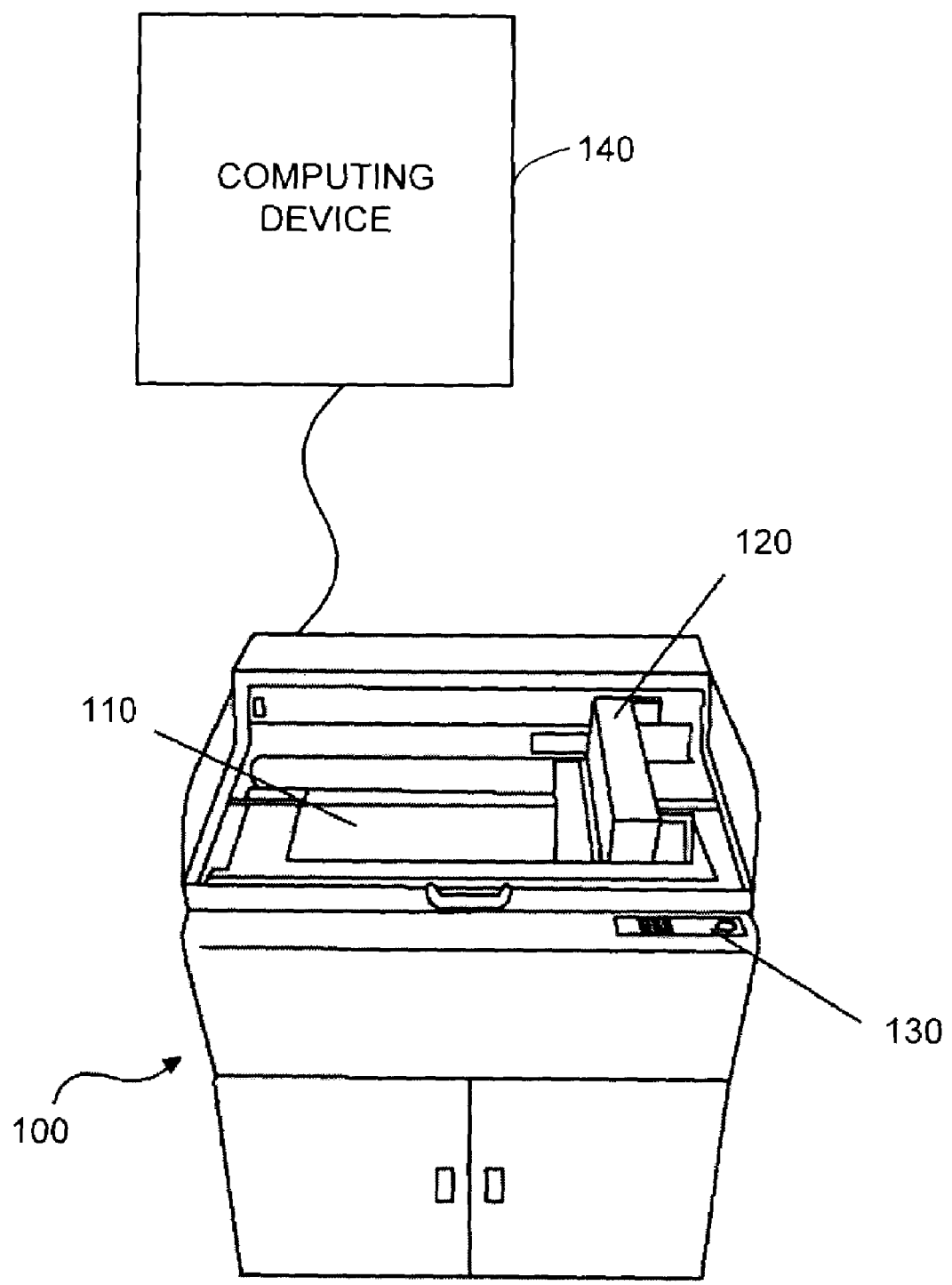
FIG. 1 is a perspective view of an SFF system that may be used to implement exemplary embodiments of the present system and method.

FIG. 1 illustrates an exemplary solid free-form fabrication (SFF) system (100) that may incorporate the present method of forming three-dimensional ceramic SFF objects. As shown in FIG. 1, an SFF system (100) may include a fabrication bin (110), a moveable carriage (120), and a display panel (130) including a number of controls and displays. Additionally, a computing device (140) may be communicatively coupled to the SFF system (100).

The fabrication bin (110) shown in FIG. 1 may be configured to receive and facilitate the building of a desired three-dimensional ceramic object on a substrate. The building of the desired three-dimensional ceramic object may include the spreading of a calcium phosphate-based powder and the selective dispensing of a solubilizing binder into the powder. While the SFF system (100) illustrated in FIG. 1 is shown as a single, stand-alone, self-contained SFF system, the present calcium phosphate based SFF system and methods may be incorporated into any SFF system that utilizes powder-based components, regardless of the structure or configuration of the free-form fabrication system.

The moveable carriage (120) of the SFF system (100) illustrated in FIG. 1 is a moveable material dispenser that may include any number of inkjet material dispensers configured to dispense liquid binder material. The moveable carriage (120) may be controlled by a computing device (140) and may be controllably moved by, for example, a shaft system, a belt system, a chain system, etc. As the moveable carriage (120) operates, the display panel (130) may inform a user of operating conditions as well as provide the user with a user interface.

As a desired three-dimensional ceramic object is formed, the computing device (140) may controllably position the moveable carriage (120) and direct one or more of the dispensers (not shown) to controllably dispense a jetted solubilizing binder at predetermined locations within the fabrication bin (110) thereby forming a pre-ceramic object that represents the desired three-dimensional object. The inkjet material dispensers used by the solid free-form fabrication system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing viscous chemical compositions. A more demonstrative cross-sectional view of the SFF apparatus of FIG. 1 is presented in FIG. 2.

Figure 2:
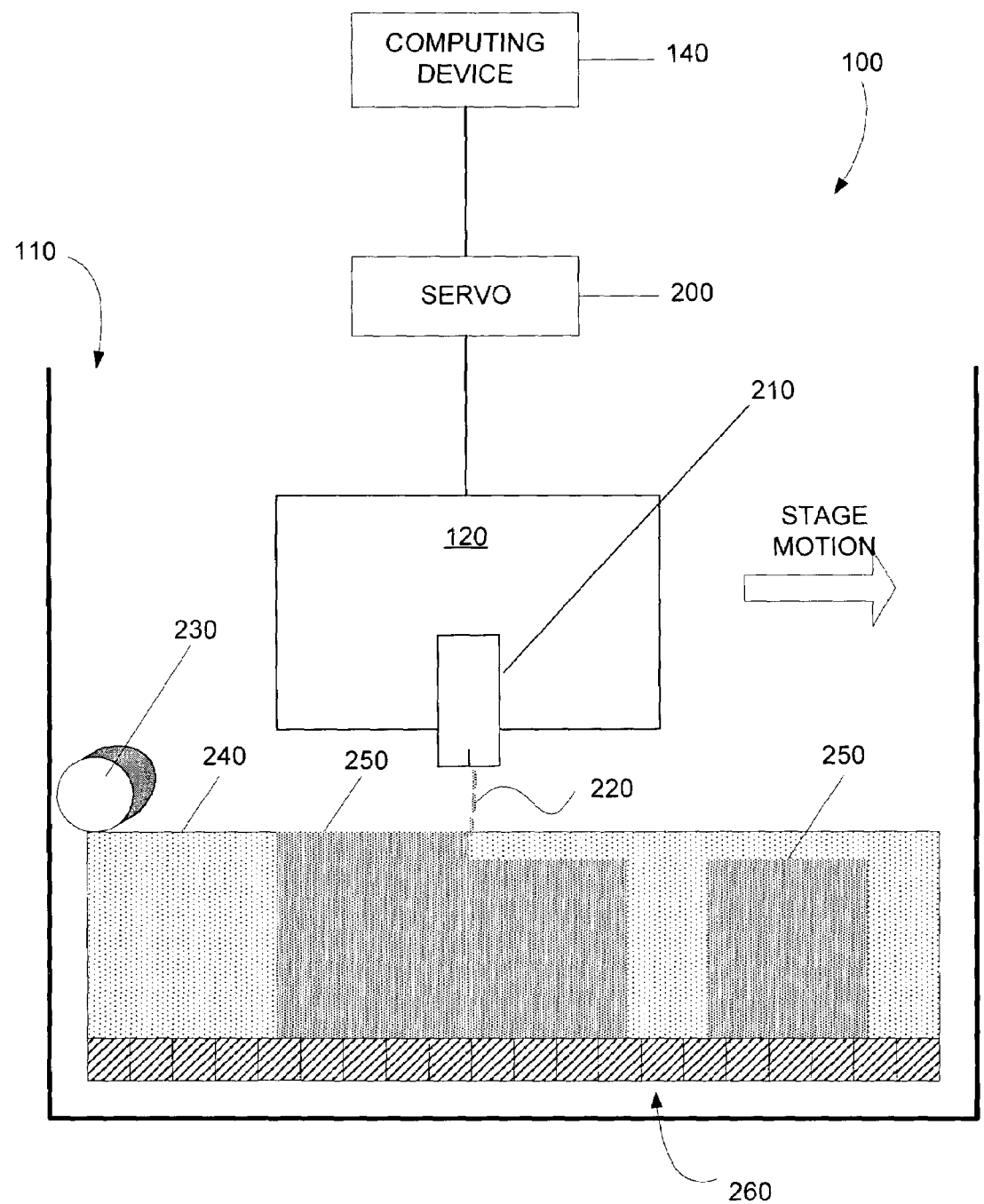
FIG. 2 is a cross-sectional view of an SFF system that may be used to implement exemplary embodiments of the present system and method.

As shown in FIG. 2, the computing device (140) may be communicatively coupled to a servo-mechanism (200). The computing device (140) may be configured to communicate commands to the servo-mechanism (200) causing it to selectively position the moveable carriage (120). One or more inkjet dispensers (210) may be coupled to the moveable carriage (120) and to a number of material reservoirs (not shown). Once positioned by the servo-mechanism (200), the inkjet dispenser (210) may eject a jetted solubilizing binder (220) supplied by the material reservoir. The jetted solubilizing binder (220) that is stored in the material reservoir (not shown) and supplied to the inkjet dispenser (210) to be dispensed is selected with a "jettable" viscosity corresponding to the inkjet dispensers (210) described above. Additionally, the jetted solubilizing binder (220) is selected to have a fairly fast reaction rate. The jetted solubilizing binder (220) will be further described below with reference to the exemplary compositions.

FIG. 2 also illustrates the components of the present system that may be incorporated to receive the jetted solubilizing binder (220) and aid in the formation of a desired three-dimensional ceramic object. As shown in FIG. 2, the fabrication bin (110) of the SFF system (100) may include a substrate (260) having a calcium phosphate-based powder (240) disposed thereon. According to one exemplary embodiment, the calcium phosphate-based powder (240) may be dispensed layer-by-layer onto the substrate (260) in bulk quantities from a calcium phosphate-based powder reservoir (not shown) and planarized to a desired thickness with the use of a mechanical roller (230) or other planarizing device. Control of the mechanical roller (230) may be performed by the servo-mechanism (200) to controllably deposit and planarize the calcium phosphate-based powder (240) on the substrate (260). The calcium phosphate-based powder (240) dispensed on the substrate may include, but is in no way limited to a calcium phosphate source, reaction retarders, and layered double hydroxides. Composition, interaction, and functions of the components of the calcium phosphate-based powder (240) as well as a method for its use will be described in further detail below with reference to FIG. 2 through FIG. 4E.

Once the jetted solubilizing binder (220) is dispensed in the layer of calcium phosphate-based powder (240), a mixture (250) of jetted solubilizing binder (220) and calcium phosphate-based powder (240) exist on the substrate (260). The mixture (250) defines the desired three-dimensional object. The system and method for using the SFF system (100) illustrated in FIG. 2 will be described in detail below with reference to FIG. 3 through FIG. 4E.

Exemplary Compositions

One exemplary embodiment of the present system and method for forming three-dimensional ceramic objects by SFF is based on employing calcium phosphate cements. Upon mixing one or several forms of calcium phosphate with an appropriate binder, the calcium phosphate dissolves and reprecipitates into a less soluble calcium phosphate. During the reprecipitation reaction the precipitating calcium phosphate crystals grow and become entangled and thereby increase mechanical strength. The present system and method applies this dissolution-reprecipitation chemistry to a calcium phosphate system that may be used to fabricate strong pre-ceramic three-dimensional objects which, after firing at elevated temperatures, yield extremely strong ceramic objects with good retention of pre-ceramic detail. Exemplary compositions of the present calcium phosphate-based powder (240) and the jetted solubilizing binder (220) will now be described in further detail below.

The calcium phosphate-based powder (240) illustrated in FIG. 2 is configured to receive the solubilizing binder (220) in specified locations defining a desired three-dimensional object, perform a dissolution/reprecipitation of calcium phosphate to form a strong pre-ceramic object, and sustain a firing procedure to produce a strong ceramic object.

According to one exemplary embodiment, the present calcium phosphate-based powder includes, but is in no way limited to, a calcium phosphate source, a reaction retardant, and layered double hydroxides. Additionally, the calcium phosphate-based powder (240) may include a number of optional components including, but in no way limited to, polyacids and accelerants. The above-mentioned components of the calcium phosphate-based powder (240) will now be described in further detail below.

The present calcium phosphate-based powder (240) illustrated in FIG. 2 is substantially composed of a calcium phosphate source. The calcium phosphate source provides an essential component of the calcium phosphate dissolution/reprecipitation reaction and may include, but is in no way limited to, tetracalcium phosphate, monocalcium phosphate (MCP), monocalcium phosphate monohydrate (MCPM), $Ca(H_2PO_4)_2 \cdot H_2O$, dicalcium phosphate (DCP), dicalcium phosphate dehydrate (DCPD), $CaHPO_4$, $CaHPO_4 \cdot H_2O$, α-,β-tricalcium phosphate, and hydroxyapatite, or any appropriate combination thereof.

Co-mingled with the calcium phosphate source are one or more reaction retardants. The reaction retardant components of the present calcium phosphate-based powder (240) modify the pH of the calcium phosphate-based powder thereby preventing premature reactions. The reaction retardants incorporated into the present calcium phosphate-based powder (240) may include, but are in no way limited to, citric acid, oxalic acid, ethylenediamine tetraacetic acid, sodium phosphate, tartaric acid, salicylic acid, and the like.

Layered double hydroxides (LDH) are also included with the calcium phosphate source according to one exemplary embodiment. Once hydrated by the solubilizing binder and formed into a pre-ceramic object, the layered double hydroxides act as moisture reservoirs and reinforcing agents in the pre-ceramic object. In this manner the LDH's increase the strength of the pre-ceramic object while increasing its resilience to environmental changes. Layered double hydroxides that may be incorporated in the present calcium phosphate-based powder (240) include, but are in no way limited to, one or more of the following: CaAl-LDH, MgAl-LDH, ZnAl-LDH, CaAl-LDH, MgAl-LDH and ZnAl-LDH. Additionally, several anions may be intercalated into the LDH including but in no way limited to, nitrate, phosphate, sulfate, carbonate, or polyanions (polyacrylic acid, polystyrene sulfonic acid, etc.). Moreover, other inorganic LDH's based on Mg, Zn, Fe, Al, Ca, etc. can also be included in the present calcium phosphate-based powder (240).

While the present system and method typically do not include polyacids, polyacids may optionally be included in the calcium phosphate-based powder (240). If included, the polyacids may react with multivalent cations present in the resulting mixture to fuel the acid-base setting mechanism explained below. The polyacids that may be included in the calcium phosphate-based powder (240) illustrated in FIG. 2 include, but are in no way limited to, polyvinyl phosphoric acid, homo-and copolymers of unsaturated aliphatic carbonic acids, polyvinyl sulphonic acid, polystyrene sulphonic acid, polyacrylic acid (PAA), and the like.

Additionally, accelerants may be included in the present calcium phosphate-based powder (240) to cause rapid hardening of the pre-ceramic object once solubilized. The accelerants that may be incorporated include, but are in no way limited to, lithium phosphate, aluminum nitrate, or iron nitrate.

According to one exemplary embodiment, the calcium phosphate-based powder (240) includes 70 wt % tetracalcium phosphate, 5 wt % citric acid, 5 wt % CaAl-LDH (NO3), 10 wt % poly acrylic acid (PAA) (60 k), 7 wt % $Li_3PO_4$, and 3 wt % magnesium fluoride ($MgF_2$).

As mentioned above, the dissolution/reprecipitation reaction occurs, thereby forming the pre-ceramic object upon dispersion of a jetted solubilizing binder (220) into the calcium phosphate-based powder (240). The jetted solubilizing binder (220) includes water or other wetting agents, humectants, and surfactants. Additionally, a pH modifier may be added to the binder.

Wetting agents are included in the jetted solubilizing binder (220) in order to facilitate wetting of the cement forming particulate blend (240) as well as to bring a number of components in the cement forming particulate blend (240) into solution to facilitate reaction. Wetting agents that may be included in the present jetted solubilizing binder (220) include, but are in no way limited to, water. Water may be used due to its low cost and efficiency in wetting cement forming powders.

The jetted solubilizing binder (220) illustrated in FIG. 2 is also jettable from an inkjet dispenser. While a liquid binder of water alone is jettable, it is jetted inefficiently. The present jetted solubilizing binder (220) is aqueous based but the following are also typically added to improve jettability: surfactants and viscosity modifiers including, but in no way limited to, SURFYNOL 465, TERGITOL-15-s-7, low molecular weight water-soluble ethylene oxide propylene oxide oligomers including liponic ethylene glycol, and many di- and tri-functional alcohols including 1,5-pentanediol.

According to one exemplary embodiment, the present jetted solubilizing binder (220) may include a pH modifier. The pH modifier may be included in the present jetted solubilizing binder (220) in order to facilitate or otherwise enhance the dissolution/reprecipitation of calcium phosphate. The pH modifiers may be acidic and include, but are in no way limited to, phosphoric acid ($H_3PO_4$), mineral acids, phytic acid, acetic acid, ethanoic acid, and the like. Alternatively, the pH modifiers may be basic and include, but are in no way limited to, a potassium hydroxide (KOH), a lithium hydroxide (LiOH), a sodium hydroxide (NaOH), a $NH_4OH$, an aluminum hydroxide ($Al(OH)_3$), a magnesium hydroxide ($Mg(OH)_2$), a calcium hydroxide ($Ca(OH)_2$), or a barium hydroxide ($Ba(OH)_2$).

Additionally, dye colorants and pigment colorants may be added to the jetted solubilizing binder (220) in order to produce a three-dimensional object of one or more colors. The dye colorants and pigment colorants may be a single color equally distributed in the jetted solubilizing binder (220) or they may be multiple colors housed in separate material reservoirs (not shown).

According to one exemplary embodiment, the jetted solubilizing binder (220) may include 6 wt % phosphoric acid ($H_3PO_4$), 3 wt % 2-pyrrolidone, 5 wt % liponic ethylene glycol (LEG-1), 2 wt % SURFYNOL 465, 78 wt % water, 5 wt % 1,5-pentanediol, and 1 wt % TERGITOL-15-s-7. This exemplary binder formulation has an acidic pH of approximately 2.5, sufficient to initiate the dissolution/reprecipitation reaction of calcium phosphate.

While the above paragraphs illustrate a number of possible chemistries that may be used to form a solubilizing binder and a calcium phosphate-based powder, both of which may be used for the production of three-dimensional ceramic objects through SFF, the cure rate, the pre-ceramic object strength, and the wettability of the three-dimensional object may be altered by varying the chemistry and percentages of the above-mentioned components. Moreover, additional water-soluble reactants may be added to the jetted solubilizing binder, or additional powders of varying reactivity may be added to the calcium phosphate-based powder to vary the properties of the pre-ceramic object produced by the present SFF process. Exemplary embodiments for using the above-mentioned structure and compositions will now be explained in detail below.

Exemplary Implementation and Operation

Figure 3:
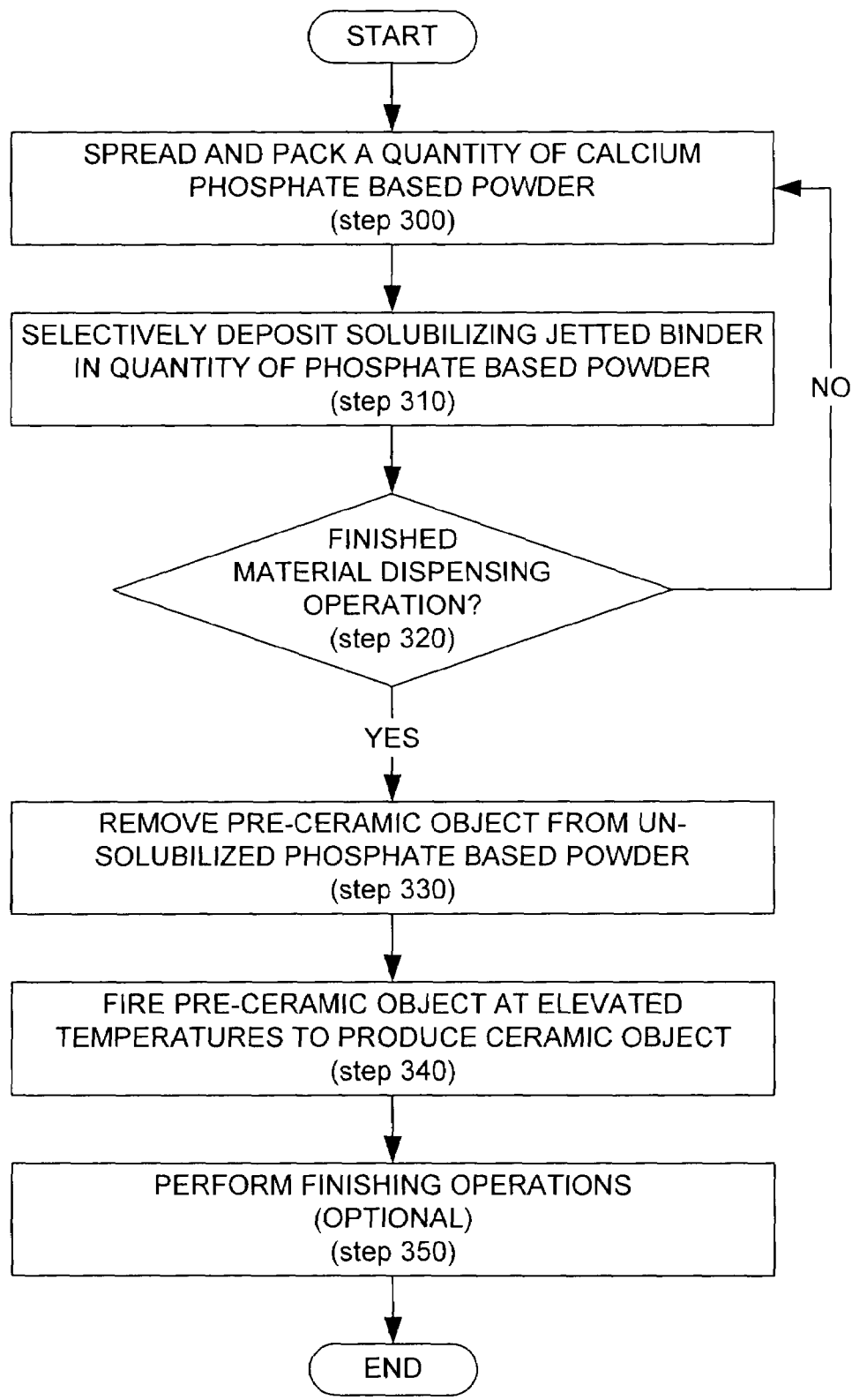
FIG. 3 is a flow chart illustrating a method for performing the present method of forming ceramic SFF objects according to one exemplary embodiment.

FIG. 3 is a flow chart illustrating an exemplary method for operating the SFF system (100; FIG. 2) illustrated in FIG. 2 while incorporating a calcium phosphate-based powder according to one exemplary embodiment. As illustrated in FIG. 3, the present method may begin by spreading and packing a quantity of calcium phosphate-based powder in the fabrication bin or on a substrate (step 300). Once the quantity of calcium phosphate-based powder has been spread and packed as necessary (step 300), the SFF apparatus selectively deposits a volume of jetted solubilizing binder into the newly spread layer of calcium phosphate-based powder (step 310). After the pre-determined volume of binder has been jetted into the calcium phosphate based powder, an operator or a coupled computing device determines whether the material dispensing operation is complete (step 320). If the material dispensing operation is not complete (NO, step 320), the present system and apparatus may again spread and pack a quantity of calcium phosphate-based powder (step 300) and continue depositing jettable solubilizing binder (step 310) until the material dispensing operation is complete. Once the material dispensing operation is complete (YES, step 320) and the pre-ceramic object is formed, the pre-ceramic object may be removed from any unbound calcium phosphate-based powder (step 330). A thermal firing process may then be performed to dry and sinter the desired three-dimensional ceramic object (step 340). After the three-dimensional ceramic object has been formed, a number of optional finishing operations may be performed on the ceramic object (step 350). Each of the above-mentioned steps of FIG. 3 will now be explained in detail with reference to FIGS. 4A through 4E.

Figure 4A:
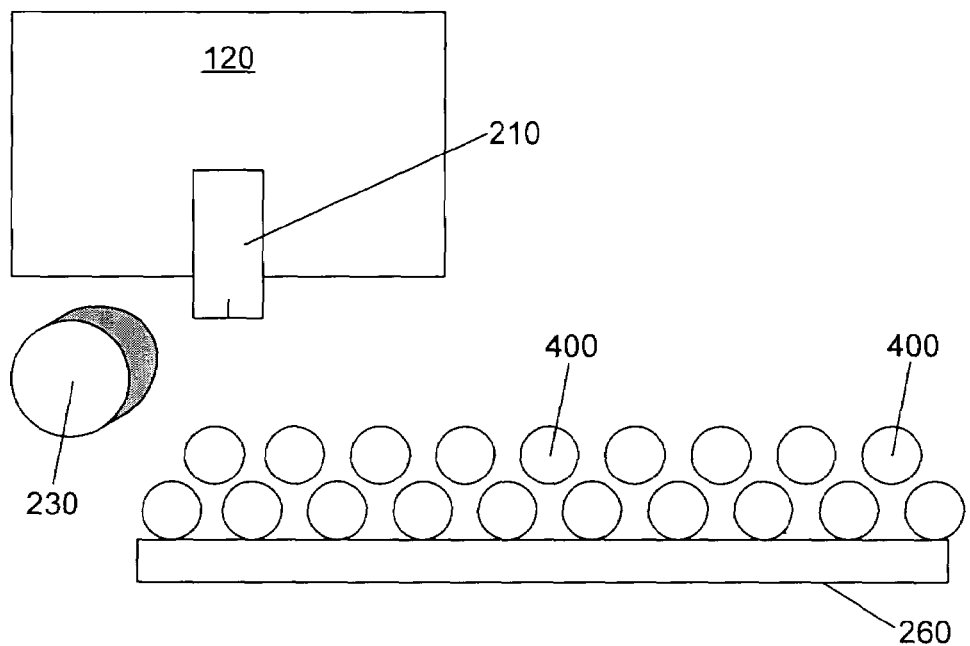
FIG. 4A is a cross-sectional view illustrating the deposition of a calcium phosphate-based powder that may be used by the present method according to one exemplary embodiment.

As shown in the flow chart of FIG. 3, the present method begins by spreading and packing a layer of calcium phosphate-based powder (step 300). FIG. 4A illustrates how the mechanical roller (230) may spread and pack a thin layer of calcium phosphate-based powder (400) on the substrate (260). First, a predetermined amount of calcium phosphate-based powder (400) is deposited on the substrate from a powder reservoir (not shown). Once deposited, the mechanical roller (230) packs and spreads a quantity of the calcium phosphate-based powder (400). The amount of calcium phosphate-based powder (400) that remains on the substrate after the mechanical roller (230) has spread and packed a thin layer corresponds to the distance between the mechanical roller (230) and the substrate (260) if no material deposition operations have been performed. Similarly, if a number of material deposition operations have been performed, the amount of calcium phosphate-based powder (400) that remains on the substrate after a roller operation corresponds to the distance between the mechanical roller (230) when it performs its spreading and packing operation and the previously dispensed binder/powder mixture (250; FIG. 2). The amount of calcium phosphate-based powder (400) deposited by the mechanical roller (230) may be adjusted by the servo-mechanism (200; FIG. 2) and optimized to correspond to the jetted binder ejection rate and wetting rate of the inkjet dispenser (210).

Figure 4B:
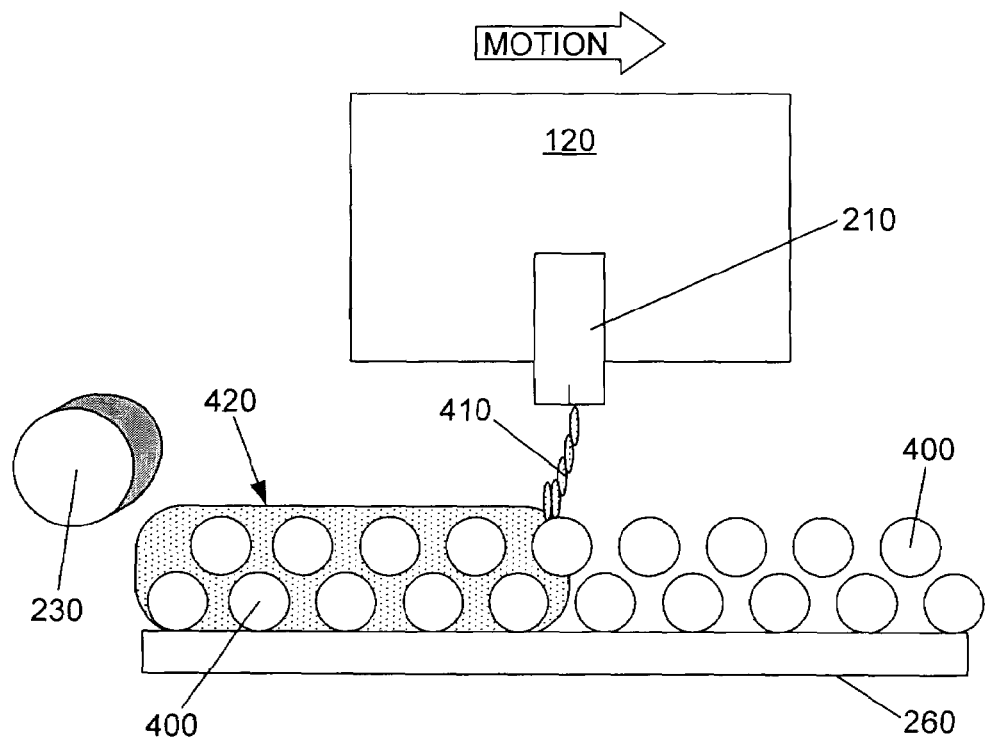
FIG. 4B is a cross-sectional view illustrating the deposition of a jetted solubilizing binder into a quantity of calcium phosphate-based powder according to one exemplary embodiment.

Once a layer of calcium phosphate-based powder (400) has been spread and packed by the mechanical roller (step 300; FIG. 3), the ink-jet dispenser (210) may selectively deposit a quantity of jetted solubilizing binder (step 310) into the calcium phosphate-based powder. As shown in FIG. 4B, the moveable carriage (120) and consequently the inkjet dispenser (210) may be controllably positioned by the computing device (140; FIG. 2) and the servo-mechanism (200; FIG. 2) adjacent to the calcium phosphate-based powder (400). When in a desired location, as directed for example by a CAD program, the inkjet dispenser (210) is actuated to dispense a pre-determined quantity of the jetted solubilizing binder (410). The jetted solubilizing binder (410) may be jetted to bind calcium phosphate-based powder (400) defining the entire desired three-dimensional object, or alternatively jetted to form a shell that defines the outer surface of the desired three-dimensional object. According to this exemplary embodiment, a shell of hydroxyapatite may be formed defining the outer surface of the desired three-dimensional object and containing sufficient calcium phosphate-based powder (400) to form a solid object. The calcium phosphate-based powder (400) disposed within the shell would then be contained within the shell and would be encapsulated until the firing process explained below.

As is shown in FIG. 4B, when the jetted solubilizing binder (410) is dispensed by the inkjet dispenser (210) onto the layer of calcium phosphate-based powder (400), the jetted solubilizing binder disperses around and mixes with the calcium phosphate-based powder (400). This mixture (420) of jetted solubilizing binder (410) and calcium phosphate-based powder (400) define the cross-section of the desired three-dimensional ceramic object or shell. When sufficient jetted solubilizing binder (410) has been deposited on a layer of calcium phosphate-based powder (400) to cover a designated portion of the layer of calcium phosphate-based powder, the moveable carriage (120) is translated to selectively deposit jetted solubilizing binder (410) onto other areas of the calcium phosphate-based powder (410) as indicated by the "motion" arrow.

The strength of the pre-ceramic object being created by the present system and method may be affected by the amount of "mixing" that occurs between the jetted solubilizing binder (410) and the calcium phosphate-based powder (400). The mixing of the two materials may in turn be dependant upon a number of factors including, but in no way limited to, the viscosity of the jetted solubilizing binder (410). A number of optional steps may also be performed to facilitate the mixing of the jetted solubilizing binder (410) with the calcium phosphate-based powder (400) including, but in no way limited to, applying ultrasonic energy to the mixture (420).

Similarly, the viscosity of the jetted solubilizing binder may be decreased by increasing the temperature of the inkjet dispenser (210). The ability to control the temperature of the inkjet dispenser (210) allows for the incorporation of more viscous higher molecular weight fluids which can provide for more desirable mechanical properties of the resulting pre-ceramic object. However, the temperature of the inkjet dispenser (210) should not exceed the vaporization temperature, decomposition temperature, or thermal activation temperature of the binder.

Once the mixture (420) of jetted solubilizing binder (410) and calcium phosphate-based powder (400) has been sufficiently "mixed," a dissolution/reprecipitation of calcium phosphate occurs within the mixture (420) thereby setting the shape of the pre-ceramic object. As shown in FIG. 4C, the re-precipitation setting mechanism (step 350) sets the three-dimensional object through re-precipitation of calcium phosphate over time, as indicated by the "time" arrow.

Individual setting times for the re-precipitation setting mechanism may be as short as about 15 seconds under certain circumstances.

The re-precipitation setting mechanism includes the combination of a calcium phosphate source such as mono-, di-, tri-, and/or tetra-calcium phosphate contained in the calcium phosphate-based powder (400) with an acidic or basic environment provided by the jetted solubilizing binder (410) in the form of phytic acid, itaconic acid, diglycolic acid, mineral acid (phosphoric acid), etc. Upon mixing, the acidic binder, which may also be basic binder according to additional embodiments, dissolves the mono-, di-, tri-, and/or tetra-calcium phosphate and provides the appropriate pH to rapidly facilitate the re-precipitation of a higher order form of calcium phosphate known as hydroxyapatite. This formation of hydroxyapatite sets to establish the cross-sectional area of the desired three-dimensional object.

Exemplary formulas for the above-mentioned calcium phosphate reaction are illustrated below where a product of $Ca_{10}(PO_4)_6(OH)_2$ is hydroxyapatite:

$$2CaHPO_4 + 2H_2O + 2Ca_4(PO_4)_2O \rightarrow Ca_{10}(PO_4)_6(OH)_2 + 4H_2O$$

$$2CaHPO_4 + 2Ca_4(PO_4)_2O \rightarrow Ca_{10}(PO_4)_6(OH)_2$$

$$10CaHPO_4 + 2H_2O \rightarrow Ca_{10}(PO_4)_6(OH)_2 + 4H_3PO_4$$

$$3Ca_4(PO_4)_2O + 3H_2O \rightarrow Ca_{10}(PO_4)_6(OH)_2 + 2Ca(OH)_2$$

Once a layer of the mixture (420) of jetted solubilizing binder (410) and calcium phosphate-based powder (400) have been sufficiently "mixed," the computing device (140; FIG. 2) will determine whether the solid free-form fabrication system (100; FIG. 2) has finished the material dispensing operation (step 320; FIG. 3) defining a desired three-dimensional ceramic object. If the requisite layers of binder/powder composite matrix (450; FIG. 4C) have been formed to construct a pre-ceramic object corresponding to a desired three-dimensional ceramic object, the computing device (140; FIG. 2) will conclude that the material dispensing operation is complete (YES, step 320; FIG. 3) and the solid free-form fabrication system (100; FIG. 2) will end its material dispensing operation. If, however, the computing device determines that the entire binder/powder composite matrix (450) has not been formed (NO, step 320; FIG. 3) sufficient to form the pre-ceramic object, the solid free-form fabrication system (100; FIG. 2) spreads and packs another layer of calcium phosphate-based powder (step 300) and the above-mentioned process begins again.

Once the material dispensing operation has been completed, the pre-ceramic object formed by the above-mentioned process is removed from any unbound calcium phosphate-based powder (step 330; FIG. 3) as shown in FIG. 4D. The strength of the pre-ceramic object formed by the above-mentioned method enables the unbound calcium phosphate-based powder to be removed from the pre-ceramic object prior to firing.

According to one exemplary embodiment, a pre-ceramic object formed by the above-mentioned method may have compression strength of at or above 0.05 Gpa. Due to this relatively high pre-ceramic strength, unbound calcium phosphate-based powder may be removed from the pre-ceramic object by any number of methods including, but in no way limited to, mechanical brushing means, cleansing the pre-ceramic object through the application of air, water, or solvent on the pre-ceramic object, etc. The removal of the unbound calcium phosphate-based powder from the pre-ceramic object may occur either within the SFF system (100; FIG. 2) or in another location.

When the pre-ceramic object has been substantially removed from the unbound calcium phosphate-based powder (step 330; FIG. 3), the pre-ceramic object may be fired to produce the desired three-dimensional ceramic object (step 340). The firing process may occur within the SFF system (100; FIG. 2), in an external furnace, in a microwave sintering apparatus, or in any other apparatus configured to controllably supply thermal energy to the binder/powder composite matrix (450; FIG. 4D). FIG. 4D illustrates a firing process being performed in an external furnace that includes a heating component (430) configured to controllably provide thermal energy (440) to the binder/powder composite matrix (450) that makes up the pre-ceramic object.

During the firing process (step 340; FIG. 3), the pre-ceramic object may first experience drying. The drying of the pre-ceramic object may initially occur at a relatively low processing temperature to prevent warping or cracking of the pre-ceramic object due to variations in moisture content and/or thickness within the object. Generally, the firing of the thermal burnout process should be of a sufficient duration so as to substantially remove the moisture from the pre-ceramic object and to sinter the hydroxyapatite. That is, once sufficient time has been allotted for the removal of moisture from the object, the temperature may be increased to sinter the hydroxyapatite thereby forming the desired ceramic object. During this portion of the firing process (step 340; FIG. 3), the binder/powder composite matrix (450) increases in strength due to the formation of strong bonds between hydroxyapatite particles and a reduction in porosity.

The temperature and time profile of the firing process may be performed in a plurality of steps or in a single process. According to one exemplary embodiment, the firing profile of a pre-ceramic object may include a step profile including a number of gradual temperature increases. Drying of the pre-ceramic object may occur during these gradual increases. After a number of step increases, the temperature may be increased to and held at a sintering temperature for the time necessary to sinter the pre-ceramic object into a ceramic object. The firing profile may be designed and optimized for any chemistry used.

Once the firing process (step 340; FIG. 3) has been completed, the desired three-dimensional ceramic object is allowed to cool and is then complete. Once the pre-ceramic object experiences the firing process (step 340; FIG. 3), a three-dimensional object, illustrated in FIG. 4E, is produced being made up of sintered hydroxyapatite (460). The sintered hydroxyapatite (460) produced by the present system and method is strong and closely corresponds to the binder/powder composite matrix (450; FIG. 4D) that made up the pre-ceramic object. According to one exemplary embodiment, the sintered hydroxyapatite (460) is dense and very strong, having a compression modulus over 10 Gpa, and retains printed detail of the pre-ceramic object.

After firing (step 340; FIG. 3), optional finishing operations may be performed (step 350; FIG. 3) to remove surface flaws, improve surface finish, or improve tolerances. Finishing operations that may be performed include, but are in no way limited to, grinding, lapping, ultrasonic machining, chemical machining, electrical-discharge machining, and/or glazing.

In conclusion, the present system and method for producing three-dimensional ceramic objects through SFF includes selectively jetting a solubilizing binder in a calcium phosphate based powder to produce a pre-ceramic object. The pre-ceramic object may then be fired to produce a dense and very strong ceramic object. Additionally, the ceramic object produced by the present system and method exhibits a high retention of its original printed detail after firing and is sufficiently strong to allow for removal of the pre-ceramic object from unbound powder using a number of techniques.

The preceding description has been presented only to illustrate and describe exemplary embodiments of the system and method. It is not intended to be exhaustive or to limit the system and method to any precise form disclosed. Many modifications and variations are possible in light of the above teaching. It is intended that the scope of the system and method be defined by the following claims.

What is claimed is:

1. A solid three-dimensional prototype composition, comprising:
    multiple layers of pre-ceramic deposited in contact with one another, each of said multiple layers of pre-ceramic comprising a particulate blend including a calcium phosphate source;
    wherein said particulate blend was hydrated by a solubilizing binder to produce said pre-ceramic;
    wherein said particulate blend comprises:
    tetracalcium phosphate;
    citric acid;
    CaAl-LDH ($NO_3$);
    poly acrylic acid (60k);
    $Li_3PO_4$; and
    magnesium fluoride.

2. The composition of claim 1, wherein said pre-ceramic has a compression modulus of 0.05 Giga-Pascal.

3. The composition of claim 1, wherein said pre-ceramic is configured to produce a ceramic upon firing.

4. The composition of claim 3, wherein said ceramic is configured to have a compression modulus over 14.0 Giga-Pascal.

5. The composition of claim 1, wherein said layers of pre-ceramic are disposed at edges of layers of said particulate blend so as to form a shell around a quantity of said particulate blend corresponding to a shape of an object being formed.

6. The composition of claim 1, wherein said solubilizing binder comprises a humectant or a surfactant.

7. A composition for forming a solid three-dimensional prototype, said composition comprising:
    a particulate blend including a calcium phosphate source from which pre-ceramic layers of an object being fabricated are formed, wherein said particulate blend comprises:
    tetracalcium phosphate;
    citric acid;
    CaAl-LDH ($NO_3$);
    polyacrylic acid (60k);
    $Li_3PO_4$; and
    magnesium fluoride; and
    a solubilizing binder for selective introduction into said particulate blend, wherein said binder is configured to dissolve calcium phosphate of said calcium phosphate source, with reprecipitation of said calcium phosphate producing said pre-ceramic.

8. A composition for forming a solid three-dimensional prototype, said composition comprising:
    a particulate blend including a calcium phosphate source from which pre-ceramic layers of an object being fabricated are formed, wherein said solubilizing binder comprises:
    phosphoric acid ($H_3PO_4$);
    2-pyrrolidone;
    liponic ethylene glycol (LEG-1);
    SURFYNOL 465;
    water;
    1,5-pentanediol; and
    TERGITOL-15-s-7; and
    a solubilizing binder for selective introduction into said particulate blend, wherein said binder is configured to dissolve calcium phosphate of said calcium phosphate source, with reprecipitation of said calcium phosphate producing said pre-ceramic.

9. The composition of claim 7, wherein said binder comprises a pH modifier.

10. The composition of claim 9, wherein said pH modifier comprises one of a phosphoric acid ($H_3PO_4$), a mineral acid, a phytic acid, an acetic acid, an ethanoic acid, a potassium hydroxide (KOH), a lithium hydroxide (LiOH), a sodium hydroxide (NaOH), a $NH_4OH$, an aluminum hydroxide ($Al(OH)_3$), a magnesium hydroxide ($Mg(OH)_2$), a a calcium hydroxide ($Ca(OH)_2$), or a barium hydroxide ($Ba(OH)_2$).

11. The composition of claim 8, wherein said binder comprises a pH modifier.

12. The composition of claim 11, wherein said pH modifier comprises one of a phosphoric acid ($H_3PO_4$), a mineral acid, a phytic acid, an acetic acid, an ethanoic acid, a potassium hydroxide (KOH), a lithium hydroxide (LiOH), a sodium hydroxide (NaOH), a $NH_4OH$, an aluminum hydroxide ($Al(OH)_3$), a magnesium hydroxide ($Mg(OH)_2$), a calcium hydroxide ($Ca(OH)_2$), or a barium hydroxide ($Ba(OH)_2$).

* * * * *

UNITED STATES PATENT AND TRADEMARK OFFICE
CERTIFICATE OF CORRECTION

PATENT NO. : 7,348,075 B2 Page 1 of 1
APPLICATION NO. : 10/696335
DATED : March 25, 2008
INVENTOR(S) : Isaac Farr et al.

It is certified that error appears in the above-identified patent and that said Letters Patent is hereby corrected as shown below:

In column 12, line 37, in Claim 10, delete "a a calcium" and insert -- a calcium --, therefor.

Signed and Sealed this

Twenty-eighth Day of April, 2009

JOHN DOLL
*Acting Director of the United States Patent and Trademark Office*